(12) United States Patent
Bonnet et al.

(10) Patent No.: US 11,267,288 B2
(45) Date of Patent: Mar. 8, 2022

(54) TIRE WITH IMPROVED BELT STRUCTURE

(71) Applicant: COMPAGNIE GENERALE DES ETABLISSEMENTS MICHELIN, Clermont-Ferrand (FR)

(72) Inventors: Aymeric Bonnet, Clermont-Ferrand (FR); Guilaine Canevet, Clermont-Ferrand (FR); Jean-Charles Derobert-Mazure, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 0 days.

(21) Appl. No.: 16/634,689

(22) PCT Filed: Jul. 2, 2018

(86) PCT No.: PCT/FR2018/051631
§ 371 (c)(1),
(2) Date: Jan. 28, 2020

(87) PCT Pub. No.: WO2019/020888
PCT Pub. Date: Jan. 31, 2019

(65) Prior Publication Data
US 2020/0231006 A1     Jul. 23, 2020

(30) Foreign Application Priority Data

Jul. 28, 2017   (FR) ..................................... 1757230

(51) Int. Cl.
*B60C 9/20*      (2006.01)
*B60C 9/28*      (2006.01)
(Continued)

(52) U.S. Cl.
CPC .............. *B60C 9/20* (2013.01); *B60C 9/0007* (2013.01); *B60C 9/0064* (2013.01);
(Continued)

(58) Field of Classification Search
CPC .... B60C 2009/2061; B60C 2009/2067; B60C 2009/2074; B60C 2009/2077;
(Continued)

(56) References Cited

U.S. PATENT DOCUMENTS 5,526,859 A * 6/1996 Saito ..................... B60C 1/0025
152/209.4
9,919,563 B2 3/2018 Lardjane et al.
(Continued)

FOREIGN PATENT DOCUMENTS

CN 103717407 A 4/2014
EP 2 738 015 A1 6/2014
(Continued)

OTHER PUBLICATIONS

Machine translation of JP 2016-203687, 2016.*
International Search Report dated Oct. 1, 2018, in corresponding PCT/FR2018/051631 (5 pages).

*Primary Examiner* — Justin R Fischer
(74) *Attorney, Agent, or Firm* — Venable LLP

(57) ABSTRACT

A tire comprises at least first and second working plies (16, 18) respectively comprising first and second reinforcing elements (50, 52) in which at least one of the following relationships is satisfied:

$$-4053 \times E1 + 4720 \leq (D1^4 \times d1 \times 1000)/E1 \quad \text{(I)}$$

$$-4053 \times E2 + 4720 \leq (D2^4 \times d2 \times 1000)/E2 \quad \text{(II)}$$

where D1, D2 are the diameter of each reinforcing element (50, 52) made up of a metallic monofilament (66, 68), and D1 and/or D2 ranges from 0.34 to 0.38 mm, d1, d2 are the
(Continued)

density of the reinforcing elements (50, 52), expressed in monofilaments per decimetre, and E1, E2 are the mean thickness of the working ply (16, 18), expressed in mm.

24 Claims, 2 Drawing Sheets

(51) Int. Cl.
  *B60C 9/00* (2006.01)
  *B60C 11/00* (2006.01)
(52) U.S. Cl.
  CPC .. *B60C 11/0008* (2013.01); *B60C 2009/2012* (2013.01); *B60C 2009/2067* (2013.01); *B60C 2009/2077* (2013.01); *B60C 2009/2083* (2013.01); *B60C 2011/0033* (2013.01)
(58) Field of Classification Search
  CPC ...... B60C 2009/209; B60C 2009/2093; B60C 9/0064; B60C 2009/2048; B60C 2009/2051; B60C 2009/2083
  See application file for complete search history.

(56) References Cited

U.S. PATENT DOCUMENTS

| | | | |
|---|---|---|---|
| 10,195,899 | B2 | 2/2019 | Hatanaka et al. |
| 10,576,787 | B2 | 3/2020 | Astaix et al. |
| 2014/0158263 | A1 | 6/2014 | Hatanaka et al. |
| 2015/0007922 | A1* | 1/2015 | Lardjane ............... B60C 9/22 152/527 |
| 2015/0013873 | A1 | 1/2015 | Lardjane et al. |
| 2016/0159155 | A1 | 6/2016 | Astaix et al. |
| 2017/0361658 | A1 | 12/2017 | Sanders et al. |
| 2020/0122507 | A1 | 4/2020 | Bonnet et al. |
| 2020/0181356 | A1 | 6/2020 | Barbouteau et al. |
| 2020/0406683 | A1 | 12/2020 | Bonnet et al. |

FOREIGN PATENT DOCUMENTS

| | | | |
|---|---|---|---|
| JP | 2015-80972 | A | 4/2015 |
| JP | 2016-203687 | * | 12/2016 |
| WO | 2012/175305 | A1 | 12/2012 |
| WO | 2013/117476 | A1 | 8/2013 |
| WO | 2015/014575 | A1 | 2/2015 |
| WO | 2016/109724 | A1 | 7/2016 |
| WO | 2018/078307 | A1 | 5/2018 |

\* cited by examiner

TIRE WITH IMPROVED BELT STRUCTURE

BACKGROUND

The invention relates to a tyre comprising an improved crown reinforcement. A tyre is understood to mean a structure of substantially toroidal shape. For preference, the invention relates to a pneumatic tyre. A pneumatic tyre is understood to mean a tyre intended to form a cavity in collaboration with a support element, for example a rim, this cavity being able to be pressurized to a pressure higher than atmospheric pressure. In contrast, a non-pneumatic tyre is not able to be pressurized.

The invention relates to the field of tyres intended to be fitted to rolling vehicles. The tyre is preferably designed for passenger vehicles but can be used on any other type of vehicle, such as two-wheeled vehicles, heavy-duty vehicles, agricultural vehicles, construction plant vehicles or aircraft or, more generally, on any rolling device.

A first prior art described in WO2013117476 is known. WO2013117476 describes a radial pneumatic tyre comprising a crown reinforcement comprising a working reinforcement comprising first and second working plies. Each working ply respectively comprises first and second reinforcing elements arranged substantially parallel to one another in each first and second working ply and respectively embedded in first and second elastomeric matrices. Each first and second reinforcing element is made up of a metallic monofilament of a diameter equal to 0.30 mm. In each first and second working ply, the density of the reinforcing elements, measured in a direction perpendicular to the main axis of the metallic monofilaments, is equal to 160 monofilaments per decimetre. The mean thicknesses, measured in the radial direction, of each first and second working ply are equal to 0.75 mm. Because of the significant thickness of each first and second working ply, the tyre described in WO2013117476 has a relatively high resistance to buckling. Because of this relatively great thickness, the mass, the hysteresis of the crown reinforcement and therefore the rolling resistance of the tyre leave room for improvement.

A second prior art described in WO2012175305 is known. WO2012175305 describes a pneumatic tyre having a crown reinforcement similar to that of WO2013117476 and in which the diameter of the metallic monofilaments is likewise equal to 0.30 mm. In contrast with the first prior art described in WO2013117476, the density of the reinforcing elements, measured in a direction perpendicular to the main axis of the metallic monofilaments, in WO2012175305 is far lower and equal to 110 monofilaments per decimetre and the mean thicknesses, measured in the radial direction, of each first and second working ply are equal to 0.48 mm. Such a pneumatic tyre was marketed by the company BARUM in 2015. Nevertheless, such a pneumatic tyre, because of its small thickness, has mediocre resistance to buckling. Furthermore, because of the low density of the reinforcing elements, the mechanical strength of the crown reinforcement is relatively low.

It is an object of the invention to propose a tyre that offers, on the one hand, better resistance to buckling than the second prior art and, on the other hand, a better compromise between the resistance to buckling and the mass of the or each ply than the first and second prior arts.

SUMMARY

The subject of the invention is a tyre defining three main directions: circumferential, axial and radial, comprising a crown comprising a tread, two sidewalls, and two beads, each sidewall connecting each bead to the crown, a carcass reinforcement anchored in each of the beads and extending in the sidewalls and in the crown, a crown reinforcement extending in the crown in the circumferential direction and situated radially between the carcass reinforcement and the tread, the crown reinforcement comprising a working reinforcement comprising at least first and second working plies, each first and second working ply respectively comprising first and second reinforcing elements arranged substantially parallel to one another in each first and second working ply, in which at least one of the following relationships I and II is satisfied:

$$-4053 \times E1 + 4720 \leq (D1^4 \times d1 \times 1000)/E1 \qquad (I)$$

where:
D1 is the diameter of each first reinforcing element made up of a metallic monofilament, expressed in mm, with D1 ranging from 0.34 to 0.38 mm,
d1 is the density of the first reinforcing elements in the first working ply, expressed in monofilaments per decimetre and measured in a direction perpendicular to the main axis of the metallic monofilaments,
E1 is the mean thickness of the first working ply, expressed in mm and measured in the radial direction;

$$-4053 \times E2 + 4720 \leq (D2^4 \times d2 \times 1000)/E2 \qquad (II)$$

where
D2 is the diameter of each second reinforcing element made up of a metallic monofilament, expressed in mm, with D2 ranging from 0.34 to 0.38 mm,
d2 is the density of the second reinforcing elements in the second working ply, expressed in monofilaments per decimetre and measured in a direction perpendicular to the main axis of the metallic monofilaments,
E2 is the mean thickness of the second working ply, expressed in mm and measured in the radial direction;
the characteristics D1, D2, d1, d2, E1, E2 being measured in the central part of the crown reinforcement of the tyre in the vulcanized state, on each side of the midplane over a total axial width of 4 cm.

By virtue of the invention, and as demonstrated by the comparative results described in the present description, the invention makes it possible to design tyres that offer, on the one hand, better resistance to buckling than the second prior art and, on the other hand, a better compromise between the resistance to buckling and the mass of the or each ply than the first and second prior arts. These tyres can be used for most uses, notably for passenger vehicles including 4×4 vehicles and SUVs (Sport Utility Vehicles) or for vans. In effect, the inventors behind the invention are putting forward the retrospective hypothesis that the resistance to buckling is greatly dependent on the bending stiffness of each working ply and that this bending stiffness is very greatly dependent on the density of the monofilaments and, to a lesser extent, on their diameters and on the thickness of the ply according to relationships I and II, unlike that which is suggested by the first and second prior arts, namely that the bending stiffness is chiefly dependent on the thickness of the ply. Thus, by virtue of the invention, a great reduction in the thickness of the ply can be compensated for by a small increase in the diameter of the monofilaments and/or a greater increase in the density thereof.

Furthermore, the cost of manufacturing such tyres is lower by comparison with tyres in which the reinforcing elements are assemblies of several metallic monofilaments, for example of 2.30 structure, as the use of steel monofilaments requires no prior assembling operation.

The diameter of the metallic monofilaments is, in the context of the invention, comprised between 0.34 and 0.38 mm. This range of values makes it possible preferably to consider metallic monofilaments of which the diameters D1 and/or D2 range from 0.35 mm to 0.37 mm.

An "axial direction" means the direction substantially parallel to the axis of rotation of the tyre.

A "circumferential direction" means the direction which is substantially perpendicular both to the axial direction and to a radius of the tyre (in other words, tangential to a circle of which the centre lies on the axis of rotation of the tyre).

A "radial direction" means the direction along a radius of the tyre, namely any direction that intersects the axis of rotation of the tyre and is substantially perpendicular to that axis.

A "circumferential midplane" (denoted M) means the plane perpendicular to the axis of rotation of the tyre and which is situated mid-way between the two beads and passes through the middle of the crown reinforcement.

The main axis of the monofilaments is the direction in which the monofilaments extend longitudinally. In the case of monofilaments which extend in a straight line, the main axis is the axis of each monofilament. In the case of monofilaments which extend in a wavy line, the main axis is the neutral axis about which each monofilament undulates.

Any range of values denoted by the expression "between a and b" represents the range of values from more than a to less than b (that is to say excluding the endpoints a and b), while any range of values denoted by the expression "from a to b" means the range of values running from a to b (that is to say including the strict endpoints a and b).

Within the context of the invention, the carbon products mentioned in the description may be of fossil or biosourced origin. In the latter case, they may partially or completely result from biomass or be obtained from renewable starting materials derived from biomass.

A "monofilament" here means any individual filament, whatever the shape of its cross section, the diameter or thickness D of which is greater than 100 μm, D representing the shortest dimension of its cross section, when the latter is non-circular. This definition therefore covers both monofilaments of essentially cylindrical shape (with a circular cross section) and monofilaments of different shape, for example oblong monofilaments (with flattened shape); in the second instance (non-circular section), the ratio of the longest dimension to the shortest dimension of the cross section is preferably less than 50, more preferentially less than 30, and in particular less than 20.

What is meant by "metallic" is that the monofilament is made, constituting more than 50% of the mass thereof, from a metallic material. More preferably, the monofilament has a steel core. The steel core is monolithic, that is to say that it is, for example, made as one piece or moulded. In one preferred embodiment, the steel core is covered with a metallic coating layer made from a metal other than steel in order for example to improve the workability of the monofilament, or the usage properties of the monofilament and/or of the tyre themselves, such as the properties of adhesion, corrosion resistance or resistance to ageing. For example, the metal of the metallic coating layer is selected from zinc, copper, tin and the alloys of these metals. Mention will be made, as examples of alloys of these metals, of brass and bronze. The steel may have a perlitic, ferritic, austenitic, bainitic or martensitic microstructure or a microstructure resulting from a mixture of these microstructures.

According to one preferential embodiment, when a carbon steel is used, its carbon content (% by weight of steel) is comprised in a range from 0.2% to 1.2%; according to another preferential embodiment, the carbon content of the steel is comprised in a range from 0.6% to 0.8%. The invention applies in particular to steels of the "Normal Tensile" (NT) or "High Tensile" (HT) steel cord type, the monofilaments then having a tensile strength (Rm) preferably higher than 2000 MPa, more preferentially higher than 2500 MPa. The total elongation at break (At) of these reinforcers, which is the sum of the elastic elongation and the plastic elongation, is preferably greater than 2.0%.

The measurements of force at break, strength at break denoted Rm (in MPa) and elongation at break denoted At (total elongation in %) are taken under tension in accordance with ISO standard 6892 of 1984.

Advantageously, the first and second reinforcing elements arranged substantially parallel to one another in each first and second working ply are respectively embedded in first and second elastomeric matrices.

An elastomeric matrix means a matrix having elastomeric behaviour. Such a matrix is advantageously based on at least one elastomer and one other ingredient.

For preference, the elastomer is a diene elastomer, that is to say, as will be recalled, any elastomer (single elastomer or blend of elastomers) which is derived, at least in part (i.e. a homopolymer or copolymer), from diene monomers, that is to say monomers which bear two carbon-carbon double bonds, whether these are conjugated or not.

This diene elastomer is more preferably selected from the group consisting of polybutadienes (BR), natural rubber (NR), synthetic polyisoprenes (IR), butadiene copolymers, isoprene copolymers and blends of these elastomers, such copolymers being notably selected from the group consisting of butadiene-styrene copolymers (SBR), isoprene-butadiene copolymers (BIR), isoprene-styrene copolymers (SIR) and isoprene-butadiene-styrene copolymers (SBIR).

One particularly preferred embodiment consists in using an "isoprene" elastomer, that is to say an isoprene homopolymer or copolymer, in other words a diene elastomer selected from the group consisting of natural rubber (NR), synthetic polyisoprenes (IR), various isoprene copolymers and mixtures of these elastomers.

Each elastomer matrix may contain a single or several diene elastomer(s), and also all or some of the additives usually employed in the matrices intended for the manufacture of tyres, such as, for example, reinforcing fillers such as carbon black or silica, coupling agents, anti-ageing agents, antioxidants, plasticizers or extender oils, whether the latter are aromatic or non-aromatic in nature (notably oils that are very slightly aromatic, if at all, for example of the naphthene or paraffin type, with high or preferably low viscosity, MES or TDAE oils), plasticizing resins with a high glass transition temperature (higher than 30° C.), agents that improve the processability of the compositions in the uncured state, tackifying resins, anti-reversion agents, methylene acceptors and donors such as HMT (hexamethylenetetramine) or H3M (hexamethoxymethylmelamine) for example, reinforcing resins (such as resorcinol or bismaleimide), known adhesion promoter systems of the metal salt type, for example, notably cobalt salts, nickel salts or lanthanide salts, and a crosslinking or vulcanization system.

For preference, the crosslinking system for each elastomer matrix is a system referred to as a vulcanization system, namely one based on sulfur (or a sulfur donor agent) and a primary vulcanization accelerator. Various known secondary vulcanization accelerators or vulcanization activators may be added to this basic vulcanization system. Sulfur is used at a preferred content of between 0.5 and 10 phr, and the primary vulcanization accelerator, for example a sulfenamide, is used at a preferred content of between 0.5 and 10 phr. The content of reinforcing filler, for example of carbon black and/or silica, is preferably higher than 30 phr, notably between 30 and 100 phr. The term "phr" means parts by weight per hundred parts of elastomer.

All carbon blacks, especially blacks of the HAF, ISAF or SAF type, conventionally used in tyres ("tyre-grade" blacks) are suitable as carbon blacks. Mention will more particularly be made, among the latter, of the carbon blacks of 300, 600 or 700 (ASTM) grade (for example, N326, N330, N347, N375, N683 or N772). Precipitated or fumed silicas having a BET surface area of less than 450 m$^2$/g, preferably of 30 to 400 m$^2$/g, are especially suitable as silicas.

A person skilled in the art will know, in light of the present description, how to adjust the formulation of the rubber compositions in order to achieve the desired levels of properties (especially modulus of elasticity), and to adapt the formulation to suit the specific application envisaged.

For preference, each elastomer matrix has, in the cross-linked state, a secant modulus in extension, at 10% elongation, comprised between 4 and 25 MPa, more preferably comprised between 4 and 20 MPa; values notably comprised between 5 and 15 MPa have proven to be particularly suitable. Modulus measurements are made under tension, unless otherwise indicated in accordance with the standard ASTM D 412 of 1998 (test specimen "C"): the "true" secant modulus (that is to say the one with respect to the actual cross section of the test specimen) is measured in second elongation (that is to say after an accommodation cycle) at 10% elongation, denoted here by Ms and expressed in MPa (under standard temperature and relative humidity conditions in accordance with standard ASTM D 1349 of 1999).

In the invention, the fact of satisfying one or other of the relationships (I) or (II) makes it possible to obtain the desired technical effect. Advantageously and optimally, the tyre satisfies both relationships I and II and makes it possible to obtain a superior technical effect.

Above a certain threshold, resistance to buckling begins to be favoured excessively over the mass of the ply. Although such resistance to buckling is desirable, it is not necessary in most of the intended tyre applications, and it will be preferable to give preference to a mass that is lower but with excellent resistance to buckling nonetheless.

Advantageously, $5300 \geq (D1^4 \times d1 \times 1000)/E1$ and/or $5300 \geq (D2^4 \times d2 \times 1000)/E2$. In one optimal configuration, $5300 \geq (D1^4 \times d1 \times 1000)/E1$ and $5300 \geq (D2^4 \times d2 \times 1000)/E2$. Above the value of 5300, resistance to buckling begins to be favoured excessively over the mass of the ply. Although such resistance to buckling is desirable, it is not necessary in most tyre applications, and it will be preferable to give preference to a mass that is lower but with excellent resistance to buckling nonetheless. For preference, $-4053 \times E1 + 4720 \leq (D1^4 \times d1 \times 1000)/E1 \leq -4140 \times E1 + 5300$ and/or $-4053 \times E2 + 4720 \leq (D2^4 \times d2 \times 1000)/E2 \leq -4140 \times E1 + 5300$.

In one embodiment in which mass is favoured in the compromise between resistance to buckling and mass, $-4053 \times E1 + 4720 \leq (D1^4 \times d1 \times 1000)/E1 \leq -4430 \times E1 + 5120$ and/or $-4053 \times E2 + 4720 \leq (D2^4 \times d2 \times 1000)/E2 \leq -4430 \times E2 + 5120$. Advantageously, and optimally, $-4053 \times E1 + 4720 \leq (D1^4 \times d1 \times 1000)/E1 \leq -4430 \times E1 + 5120$ and $-4053 \times E2 + 4720 \leq (D2^4 \times d2 \times 1000)/E2 \leq -4430 \times E2 + 5120$.

In one embodiment in which resistance to buckling is favoured in the compromise between resistance to buckling and mass, $-4430 \times E1 + 5120 \leq (D1^4 \times d1 \times 1000)/E1 \leq -4140 \times E1 + 5300$ and/or $-4430 \times E2 + 5120 \leq (D2^4 \times d2 \times 1000)/E2 \leq -4140 \times E2 + 5300$. Advantageously and optimally, $-4430 \times E1 + 5120 \leq (D1^4 \times d1 \times 1000)/E1 \leq -4140 \times E1 + 5300$ and $-4430 \times E2 + 5120 \leq (D2^4 \times d2 \times 1000)/E2 \leq -4140 \times E2 + 5300$.

Advantageously, $(D1^4 \times d1 \times 1000)/E1 \geq 2050$ and/or $(D2^4 \times d2 \times 1000)/E2 \geq 2050$. For preference, the tyre satisfies the two relationships $(D1^4 \times d1 \times 1000)/E1 \geq 2050$ and $(D2^4 \times d2 \times 1000)/E2 \geq 2050$. With such values, plies that have both good resistance to buckling and a relatively small thickness are favoured, and this contributes to reducing the hysteresis of the tyre.

For preference, $(D1^4 \times d1 \times 1000)/E1 \geq 2500$ and/or $(D2^4 \times d2 \times 1000)/E2 \geq 2500$. For preference, the tyre satisfies the two relationships $(D1^4 \times d1 \times 1000)/E1 \geq 2500$ and $(D2^4 \times d2 \times 1000)/E2 \geq 2500$. More preferably, $(D1^4 \times d1 \times 1000)/E1 \geq 2700$ and/or $(D2^4 \times d2 \times 1000)/E2 \geq 2700$ and optimally $(D1^4 \times d1 \times 1000)/E1 \geq 2700$ and $(D2^4 \times d2 \times 1000)/E2 \geq 2700$. With such values, plies that have both good resistance to buckling and a relatively small thickness are favoured, and this contributes even more to reducing the hysteresis of the tyre.

Advantageously, $3500 \geq (D1^4 \times d1 \times 1000)/E1$ and/or $3500 \geq (D2^4 \times d2 \times 1000)/E2$. In one optimal configuration, $3500 \geq (D1^4 \times d1 \times 1000)/E1$ and $3500 \geq (D2^4 \times d2 \times 1000)/E2$. Above the value of 3500, resistance to buckling begins to be favoured excessively over the mass of the ply. Although such resistance to buckling is desirable, it is not necessary in most of the intended tyre applications, and it will be preferable to give preference to a mass that is lower but with excellent resistance to buckling nonetheless.

Advantageously, d1 and/or d2 ranges from 70 to 180 monofilaments per decimetre, preferably from 70 to 120 monofilaments per decimetre. Optimally, d1 and d2 range from 70 to 180 monofilaments per decimetre, preferably from 70 to 120 monofilaments per decimetre.

On the one hand, the higher the density of monofilaments, the greater the improvement to the endurance of the ply or plies and therefore of the tyre. On the other hand, beyond a certain monofilament-density threshold, it becomes difficult to form bridges of rubber between the monofilaments, and this detracts from the endurance of the ply or of the plies and therefore of the tyre, particularly as a result of the cleaving that corresponds to the appearance of cracks that spread between each first and second working ply.

In one embodiment in which $D1 \leq 0.36$ mm, d1 ranges from 90 to 110 monofilaments per decimetre, preferably from 95 to 105 monofilaments per decimetre. Similarly, in the embodiment in which $D2 \leq 0.36$ mm, d2 ranges from 90 to 110 monofilaments per decimetre, preferably from 95 to 105 monofilaments per decimetre. In an optimal embodiment in which $D1 \leq 0.36$ mm, and $D2 \leq 0.36$ mm, d1 and d2 range from 90 to 110 monofilaments per decimetre, preferably from 95 to 105 monofilaments per decimetre.

In an embodiment in which $D1 \geq 0.36$ mm, d1 ranges from 70 to 90 monofilaments per decimetre, preferably from 70 to 80 monofilaments per decimetre. Similarly, in the embodiment in which $D2 \geq 0.36$ mm, d2 ranges from 70 to 90 monofilaments per decimetre, preferably from 70 to 80 monofilaments per decimetre. In an optimal embodiment in which $D1 \geq 0.36$ mm, and $D2 \geq 0.36$ mm, d1 and d2 range from 70 to 90 monofilaments per decimetre, preferably from 70 to 80 monofilaments per decimetre.

Advantageously, E1 and/or E2 is less than 0.75 mm, preferably less than or equal to 0.70 mm, more preferably less than or equal to 0.60 mm, and more preferably still less than or equal to 0.55 mm. Advantageously, E1 and/or E2 is greater than or equal to 0.40 mm, preferably greater than or equal to 0.45 mm. In an optimal configuration, E1 and E2 are less than 0.75 mm, preferably less than or equal to 0.70 mm, more preferably less than or equal to 0.60 mm, and more preferably still less than or equal to 0.55 mm. Advantageously, E1 and E2 are greater than or equal to 0.40 mm, preferably greater than or equal to 0.45 mm. The smaller the thickness of the or each ply, the lower the hysteresis and therefore the rolling resistance. Furthermore, the bridges of rubber between the monofilaments allow the forces applied to the or each ply to be reacted correctly. However, too small a thickness of ply presents a significant risk of having bridges of rubber that are imperfectly formed, and therefore of reacting the forces in the or each ply poorly. Furthermore, too small a thickness of ply presents the risk of bringing the monofilaments of the radially outermost ply of the tyre closer to the hoop reinforcement. When the tyre is attacked, notably in damp environments and under the effect of running, the tyre then presents a risk of water being present in the vicinity of the reinforcing elements, something which encourages the corrosion of the radially outermost ply. Reducing the thickness of the or each ply therefore has the effect of making the tyre more sensitive to corrosion.

In certain embodiments in which there is a desire to maximize the life of the tyre and, notably, its resistance to corrosion, a ply thickness that limits the risks of corrosion will be selected.

In other embodiments in which the desire is to favour a reduction in hysteresis and rolling resistance, this sensitivity to corrosion takes second place and relatively small ply thicknesses will be favoured.

Advantageously, the mean thickness Ey radially separating a first reinforcing element and a second reinforcing element, measured in the radial direction, ranges from 0.05 to 0.40 mm, preferably from 0.10 to 0.30 mm, and more preferably from 0.12 to 0.28 mm. This distance of separation between the first and second plies notably has an impact on the flexural inertia of the working reinforcement, a greater thickness Ey giving the working reinforcement as a whole greater resistance to buckling. Furthermore, the greater the thickness Ey, the less sensitive the monofilaments are to corrosion. Finally, a higher thickness will allow better mechanical decoupling between the working plies and therefore give the crown reinforcement better endurance. Conversely, too great a thickness is undesirable as it would penalize the mass and hysteresis of the crown reinforcement.

As for the characteristics D1, D2, d1, d2, E1, E2, Ey is measured in the central part of the crown reinforcement of the tyre in the vulcanized state, on each side of the midplane M over a total axial width of 4 cm. Expressed in a different way, Ey is the mean of the minimum "back-to-back" distances Ey separating each first reinforcing element from the second reinforcing element closest to it in the radial direction, this mean being calculated across all of the reinforcing elements present in the central part of the working reinforcement, in an axial range extending between −2 cm and +2 cm about the midplane M.

Advantageously, Ey and D1 satisfy the following relationship:

$$0.15 \leq Ey/(Ey+D1) \leq 0.50,$$

preferably $0.22 \leq Ey/(Ey+D1) \leq 0.45,$ and more preferably $0.25 \leq Ey/(Ey+D1) \leq 0.42.$ Advantageously, Ey and D2 satisfy the following relationship:

$$0.15 \leq Ey/(Ey+D2) \leq 0.50,$$

preferably $0.22 \leq Ey/(Ey+D2) \leq 0.45,$ and more preferably $0.25 \leq Ey/(Ey+D2) \leq 0.42.$ In an optimal configuration, Ey, D1 and D2 satisfy the relationships described hereinabove. In this way, the resistance to buckling of the entire crown reinforcement is maximized while at the same time maintaining a reasonable mass and hysteresis for this crown reinforcement.

In one preferred embodiment, the first reinforcing elements form an angle ranging from 10 to 45 degrees with the circumferential direction.

In one preferred embodiment, the second reinforcing elements form an angle ranging from 10 to 45 degrees with the circumferential direction.

Advantageously, the first and second reinforcing elements are crossed relative to one another between the first working ply and the second working ply. Thus, if the angle that the first reinforcing elements make with the circumferential direction is positive, the angle made by the second reinforcing elements with this same circumferential direction is negative. Conversely, if the angle that the first reinforcing elements make with the circumferential direction is negative, the angle made by the second reinforcing elements with this same circumferential direction is positive.

In one preferred embodiment, the angle that the first reinforcing elements make with the circumferential direction is, in terms of absolute value, substantially equal to the angle made by the second reinforcing elements with this same circumferential direction.

In one embodiment, the force at break of the first working ply and/or the force at break of the second working ply ranges from 18000 N·dm$^{-1}$ to 32000 N·dm$^{-1}$, preferably from 20000 N·dm$^{-1}$ to 30000 N·dm$^{-1}$.

In one embodiment in which D1≤0.36 mm, the force at break of the first working ply ranges from 24000 N·dm$^{-1}$ to 29000 N·dm$^{-1}$. Similarly, in one embodiment in which D2≤0.36 mm, the force at break of the second working ply ranges from 24000 N·dm$^{-1}$ to 29000 N·dm$^{-1}$. Optimally, in one embodiment in which D1≤0.36 mm, and D2≤0.36 mm, the force at break of the first working ply and the force at break of the second working ply ranges from 24000 N·dm$^{-1}$ to 29000 N·dm$^{-1}$.

In one embodiment in which D1>0.36 mm, the force at break of the first working ply ranges from 20000 N·dm$^{-1}$ to 24000 N·dm$^{-1}$. Similarly, in one embodiment in which D2≤0.36 mm, the force at break of the second working ply ranges from 20000 N·dm$^{-1}$ to 24000 N·dm$^{-1}$. Optimally, in one embodiment in which D1≤0.36 mm, and D2≤0.36 mm, the force at break of the first working ply and the force at break of the second working ply ranges from 20000 N·dm$^{-1}$ to 24000 N·dm$^{-1}$.

Such forces at break for the ply make it possible to ensure particularly high endurance without thereby penalizing the compromise sought by the invention. The advantage of having a sufficiently high force at break is that, in the event of partial breakage of the or of each ply under the effect of buckling or attack, the tyre maintains a margin of safety before any loss of integrity. Such forces at break also make it possible to comply with certain regulatory tests of "breaking energy" type, this test replicating use on roads that are in poor condition and may comprise perforating obstacles.

The force at break of a ply is measured by multiplying the number of reinforcing elements present over a length of 10 cm of the ply in the axial direction by the individual force at break of each reinforcing element. The individual force at break of each reinforcing element is measured in accordance with the ISO standard 6892 of 1984.

For preference, the tyre comprises a hoop reinforcement comprising at least one hooping ply comprising textile reinforcing elements arranged substantially parallel to one another in the hooping ply. For preference, these textile reinforcing elements are embedded in a third elastomeric matrix.

The textile reinforcing elements may have any known form; admittedly they may be monofilaments but they are more usually made up of multifilament fibres twisted together in the form of textile ropes.

Advantageously, the textile reinforcing elements form an angle at most equal to 10°, preferably ranging from 5° to 10°, with the circumferential direction.

Advantageously, the textile reinforcing elements are heat-shrinkable. That means that with a rise in temperature, the material of which the textile reinforcing elements are made shrinks. The thermal contraction CT of the textile reinforcing elements, measured after 2 min at 185° C., is advantageously less than 7.5% under the below-listed test conditions, preferably less than 3.5%, more preferably less than 3%, which values have proven to be optimal for the manufacturing and dimensional stability of the tyres, particularly during the phases of curing and cooling thereof. The parameter CT is measured, unless specified otherwise, in accordance with the standard ASTM D1204-08, for example on an apparatus of the "TESTRITE" type under what is known as a standard pretension of 0.5 cN/tex (which is therefore expressed with respect to the titre or linear density of the sample tested). At constant length, the maximum force of contraction (denoted $F_c$) is also measured using the above test, this time at a temperature of 180° C. and under 3% elongation. This force of contraction $F_c$ is preferentially greater than 20 N (Newtons). A high force of contraction has proven to be particularly beneficial to the hooping capability of the heat-shrinkable textile reinforcing elements with respect to the crown reinforcement of the tyre when the latter heats up under high running speed.

The above parameters CT and $F_c$ can be measured without distinction on the initial adhesive-coated textile reinforcing elements before they are incorporated into the ply and the tyre or alternatively can be measured on these reinforcing elements once they have been extracted from the central zone of the vulcanized tyre and preferably "derubberized" (i.e. stripped of the elastomer matrix in which they are embedded).

Any heat-shrinkable textile material that satisfies the contraction features CT mentioned hereinabove is suitable. For preference, this heat-shrinkable textile material is selected from the group consisting of polyamides, polyesters and polyketones. Among the polyamides, mention may be made notably of the polyamides 4-6, 6, 6-6, 11 or 12. Mention may be made, among the polyesters, for example, of PET (polyethylene terephthalate), PEN (polyethylene naphthalate), PBT (polybutylene terephthalate), PBN (polybutylene naphthalate), PPT (polypropylene terephthalate) and PPN (polypropylene naphthalate). Hybrid reinforcers made up of two (at least two) different materials such as aramid/nylon, aramid/polyester, aramid/polyketone hybrid cords, for example, can also be used provided that they satisfy the recommended CT characteristic.

In one embodiment, notably applicable to tyres intended for competition use, the tread has a thickness ranging from 3 mm to 6 mm, preferably from 3.5 mm to 4.5 mm. In another embodiment also applicable to tyres intended for competition use, the tread has a thickness ranging from 5.5 mm to 7 mm. In these embodiments, the smaller the thickness of the tread, the smaller the lateral force exerted on the working plies and the lower the risk of buckling. In combination with the features of the invention, such tread thicknesses are particularly advantageous because they reduce the risk of buckling of highly stressed tyres such as tyres intended for competition use.

In another embodiment, notably applicable to tyres intended for passenger vehicles, the tread has a thickness ranging from 7 mm to 10.5 mm, preferably from 8 mm to 10 mm. In the same way as in the previous embodiment, in combination with the features of the invention, such tread thicknesses are particularly advantageous because they reduce the risk of buckling of tyres that are particularly sensitive to this as a result of a relatively high tread thickness.

What is meant by tread thickness is the mean distance measured, in the radial direction on each side of the midplane over a total axial width of 4 cm, between, on a new tyre, the external surface of the tread that is intended to come into contact with the ground, and the radially external surface of the crown reinforcement that acts as an interface with the radially internal surface of the tread.

BRIEF DESCRIPTION OF THE DRAWINGS

The invention and the advantages thereof will be easily understood in the light of the detailed description and entirely nonlimiting exemplary embodiments which follow, and also of the figures in which.

DETAILED DESCRIPTION

Tyre According to a First Embodiment of the Invention

A frame of reference X, Y, Z corresponding to the usual respectively axial (X), radial (Y) and circumferential (Z) directions of a tyre has been depicted in the figures.

Figure 1:
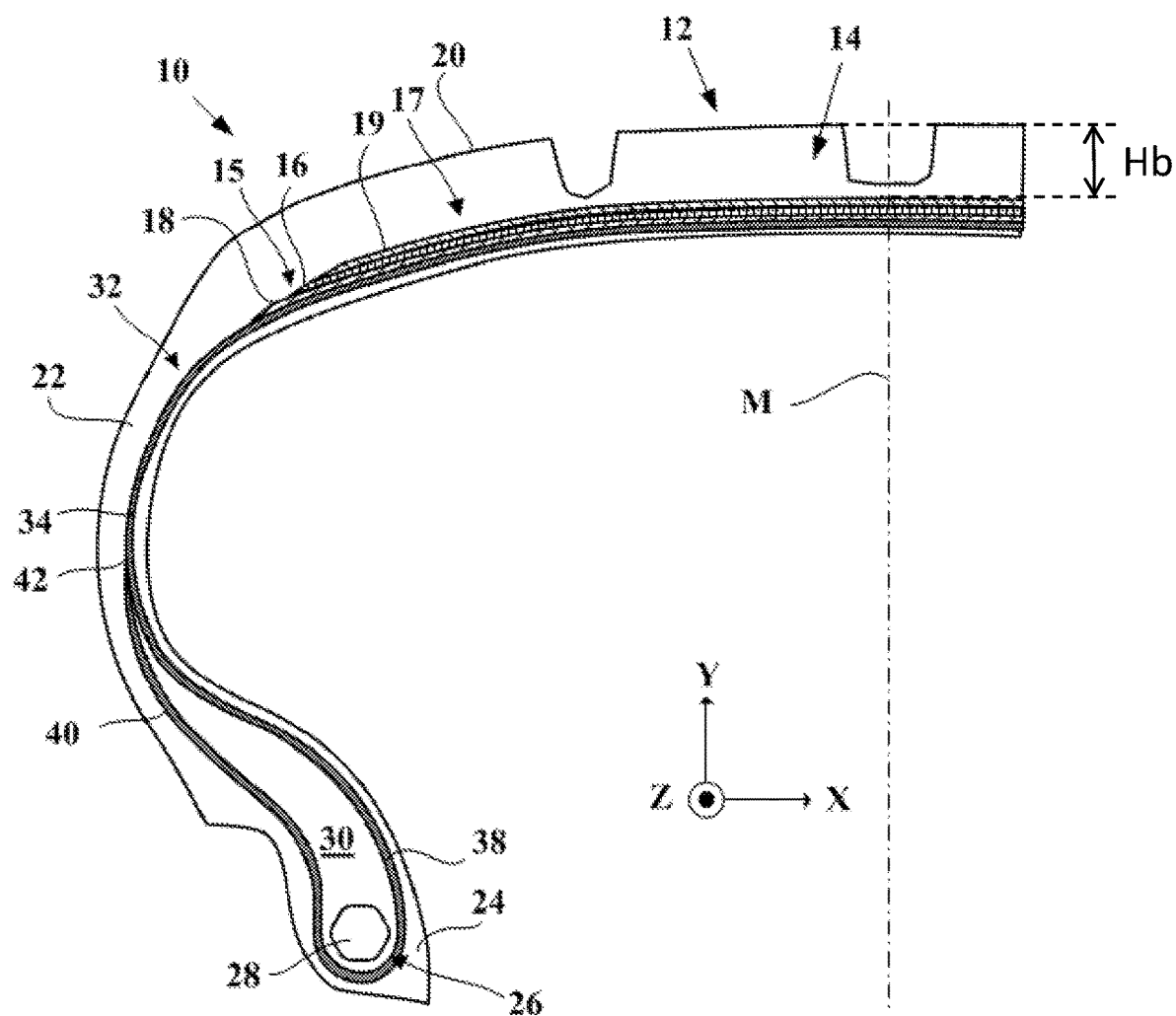
FIG. 1 illustrates a view in radial section (namely in section on a plane containing the axis of rotation of the tyre) of a tyre according to the invention.

FIG. 1 depicts a tyre, in this case a pneumatic tyre, in accordance with a first embodiment of the invention and denoted by the general reference 10. The tyre 10 substantially exhibits revolution about an axis substantially parallel to the axial direction X. The tyre 10 here is intended for a passenger vehicle.

The tyre 10 is of the radial type and comprises a crown 12 comprising a tread 20 and a crown reinforcement 14 extending in the crown 12 in the circumferential direction Z. The crown reinforcement 14 comprises a working reinforcement 15 comprising first and second working plies 16, 18 and a hoop reinforcement 17 comprising a hooping ply 19. The crown reinforcement 14 is surmounted by the tread 20. In this case, the hoop reinforcement 17, in this case the hooping ply 19, is radially interposed between the working reinforcement 15 and the tread 20.

The tyre comprises two sidewalls 22 extending the crown 12 radially inwards. The tyre 10 further comprises two beads 24 radially on the inside of the sidewalls 22 and each comprising an annular reinforcing structure 26, in this instance a bead wire 28, surmounted by a mass of filling rubber 30, and also a radial carcass reinforcement 32. The crown reinforcement 14 is situated radially between the carcass reinforcement 32 and the tread 20. Each sidewall 22 connects each bead 24 to the crown 12.

The carcass reinforcement 32 preferably comprises a single carcass ply 34 of radial textile reinforcing elements. The carcass reinforcement 32 is anchored in each of the beads 24 by being turned up around the bead wire 28, so as to form, within each bead 24, a main strand 38 extending from the beads 24 through the sidewalls 22 as far as into the crown 12, and a turnup strand 40, the radially outer end 42 of the turnup strand 40 being radially on the outside of the annular reinforcing structure 26. The carcass reinforcement 32 thus extends from the beads 24 through the sidewalls 22 as far as into the crown 12. In this embodiment, the carcass reinforcement 32 also extends axially through the crown 12.

In this embodiment, the tread 20 has a thickness Hb ranging from 7 mm to 10.5 mm, preferably from 8 mm to 10 mm. In this instance Hb=9 mm. This thickness Hb is the mean of 10 measurements taken on each side of the midplane over a total axial width of 4 cm, on the tyre 10 when new, between the external surface of the tread 20 that is intended to come into contact with the ground, and the radially external surface of the crown reinforcement 14, in this instance the radially external surface of the hoop reinforcement 17 that acts as an interface with the radially internal surface of the tread 20. As an alternative, it would be possible to conceive of smaller thicknesses Hb, for example thicknesses ranging from 3 mm to 6 mm, preferably from 3.5 mm to 4.5 mm, or also thicknesses Hb ranging from 5.5 mm to 7 mm.

Each working ply 16, 18, hooping ply 19 and carcass ply 34 comprises an elastomer matrix in which reinforcing elements of the corresponding ply are embedded. Each elastomer matrix of the working plies 16, 18, hooping ply 19 and carcass ply 34 is based on a conventional composition for the skimming of reinforcing elements conventionally comprising a diene elastomer, for example natural rubber, a reinforcing filler, for example carbon black and/or silica, a crosslinking system, for example a vulcanization system, preferably comprising sulfur, stearic acid and zinc oxide, and possibly a vulcanization accelerator and/or retarder and/or various additives.

Figure 2:
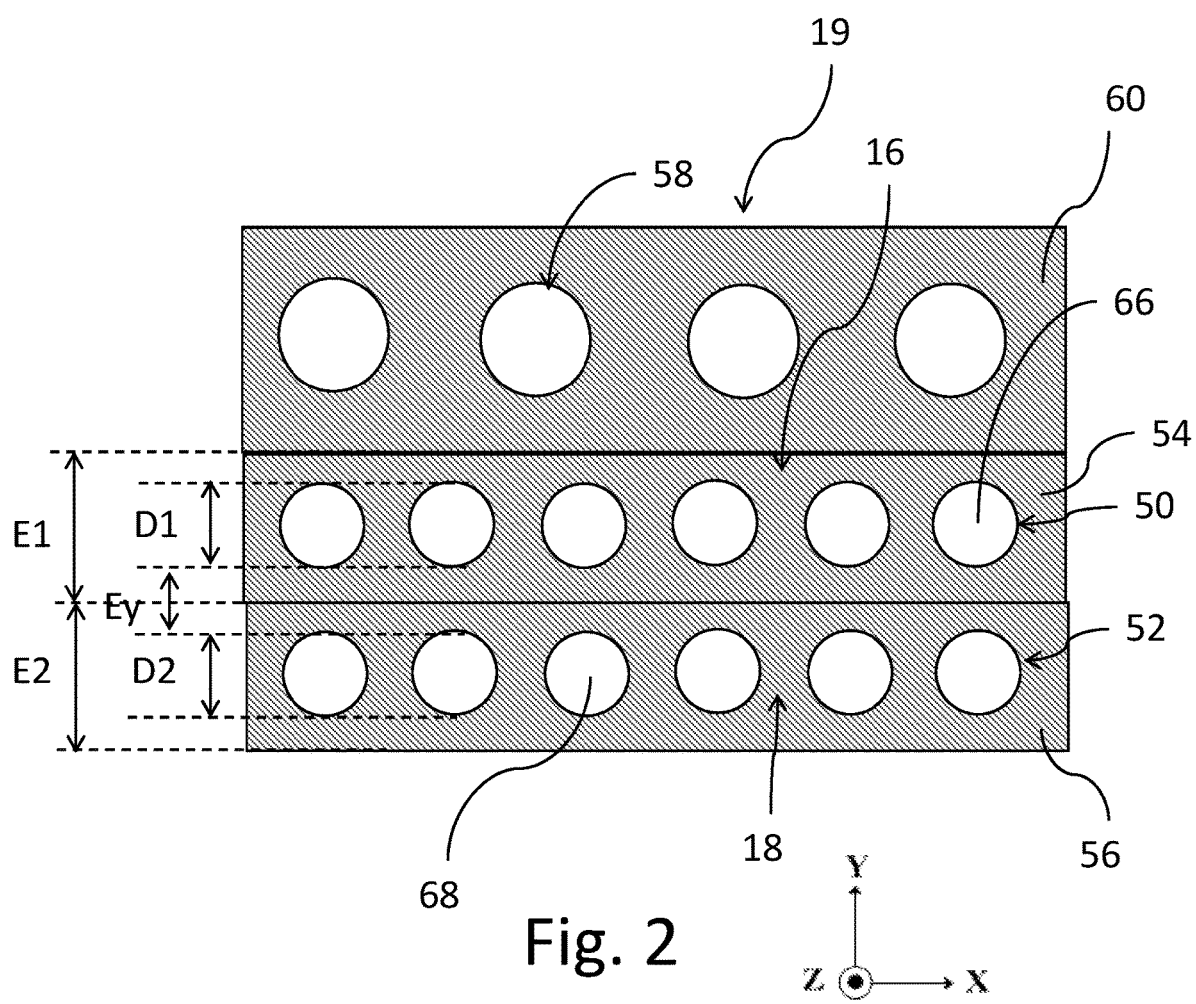
FIG. 2 is a detail view of the crown reinforcement of the tyre of FIG. 1.

In this particular instance and with reference to FIG. 2, each first and second working ply 16, 18 respectively comprises first and second reinforcing elements 50, 52 arranged substantially parallel to one another in each first and second working ply 16, 18 and respectively embedded in first and second elastomeric matrices 54, 56. The first reinforcing elements 50 make an angle ranging from 10 to 45 degrees with the circumferential direction Z of the tyre 10. Similarly, the second reinforcing elements 52 make an angle ranging from 10 to 45 degrees with the circumferential direction Z of the tyre 10. The first and second reinforcing elements 50, 52 are crossed relative to one another between the first working ply 16 and the second working ply 18. Thus, the angle formed by the first reinforcing elements 50 and the circumferential direction Z is equal here to +23°, whereas the angle formed by the second reinforcing elements 52 and the circumferential direction Z is equal here to −23°. In an alternative form, it might be conceivable to have angles respectively equal to +38° and −38°.

The hooping ply 19 comprises textile reinforcing elements 58 arranged substantially parallel to one another in the hooping ply 19 and embedded in a third elastomeric matrix 60. The textile reinforcing elements 58 form an angle at most equal to 10°, preferably ranging from 5° to 10°, with the circumferential direction Z of the tyre 10. In this case, each textile reinforcing element is made from a heat-shrinkable material, here made of polyamide 66. Each textile reinforcing element comprises two multifilament strands made from a heat-shrinkable material, here made of polyamide 66, which are individually overtwisted at 250 twists·m$^{-1}$ in one direction then twisted together at 250 twists·m$^{-1}$ in the opposite direction. The two multifilament strands are helically wound around one another. Each multifilament strand has a titre equal to 140 tex. The thermal contraction CT of each hooping textile reinforcing element is approximately equal to approximately 7%.

The carcass ply 34 comprises radial carcass textile reinforcing elements arranged substantially parallel to one another and that form an angle ranging from 65° to 90° with the circumferential direction Z of the tyre 10. In this case, each carcass textile reinforcing element comprises two multifilament strands made of polyester, here made of PET, which are individually overtwisted at 420 twists·m$^{-1}$ in one direction then twisted together at 420 twists·m$^{-1}$ in the opposite direction. The two multifilament carcass strands are helically wound around one another. Each multifilament carcass strand has a titre equal to 144 tex. The radial textile reinforcing elements are embedded in an elastomeric matrix.

Each first and second reinforcing element 50, 52 is made up of a metallic monofilament respectively denoted by the reference 66, 68. Each metallic monofilament 66, 68 comprises a steel core coated with a layer of metallic coating, for example brass or zinc. Each metallic monofilament 66, 68 has a respective diameter D1, D2, expressed in mm, ranging from 0.34 mm to 0.38 mm, according to the invention, preferably from 0.35 mm to 0.37 mm and here less than or equal to 0.36 mm. In this first embodiment, D1=D2=0.35 mm. The steel is a carbon steel of the HT type having a strength Rm equal to 2838 MPa for a diameter of 0.35 mm (namely 273 N).

Each density d1, d2 of the first and the second reinforcing elements 50, 52 in each first and second working ply 16, 18, expressed in monofilaments per decimetre and measured in a direction perpendicular to the main axis of the metallic monofilaments, ranges from 70 to 180 monofilaments per decimetre, preferably from 70 to 120 monofilaments per decimetre. Here, the main axis of the metallic monofilaments of each working ply makes an angle equal to ±23° with the circumferential direction Z. Here, because each diameter D1, D2 is less than or equal to 0.36 mm, each density d1, d2 ranges from 90 to 110 monofilaments per decimetre, preferably from 95 to 105 monofilaments per decimetre, and is here such that d1=d2=100 monofilaments per decimetre.

The force at break of each first and second working ply 16, 18 ranges from 18000 N·dm$^{-1}$ to 32000 N·dm$^{-1}$, preferably from 20000 N·dm$^{-1}$ to 30000 N·dm$^{-1}$. Here, because each diameter D1, D2 is less than or equal to 0.36 mm, the force at break of each first and second working ply 16, 18 ranges from 24000 N·dm$^{-1}$ to 29000 N·dm$^{-1}$, and in this instance is equal to 27300 N·dm$^{-1}$.

The mean thickness Ey radially separating a first reinforcing element 50 and a second reinforcing element 52, measured in the radial direction Y, ranges from 0.05 to 0.40 mm, preferably from 0.10 to 0.30 mm, and more preferably from 0.12 to 0.28 mm. In this instance, Ey=0.15 mm. Ey and D1 satisfy the following relationship $0.15 \leq Ey/(Ey+D1) \leq 0.50$, for preference $0.22 \leq Ey/(Ey+D1) \leq 0.45$, and more preferably 0.25≤Ey/(Ey+D1)≤0.42. In this instance, Ey/(Ey+D1)=0.29. Similarly, Ey and D2 satisfy the following relationship 0.15≤Ey/(Ey+D2)≤0.50, for preference 0.22≤Ey/(Ey+D2)≤0.45, and more preferably 0.25≤Ey/(Ey+D2)≤0.42. In this instance, Ey/(Ey+D2)=Ey/(Ey+D1)=0.29.

Each mean thickness E1, E2 of each first and second working ply 16, 18, respectively, expressed in mm and measured in the radial direction Y is less than 0.75 mm, preferably less than or equal to 0.70 mm, more preferably less than or equal to 0.60 mm, and more preferably still less than or equal to 0.55 mm, and greater than or equal to 0.40 mm, preferably greater than or equal to 0.45 mm. In this case E1=E2=0.50 mm.

With the values described above, $(D1^4 \times d1 \times 1000)/E1 = (D2^4 \times d2 \times 1000)/E2 = 3024$. Thus, $(D1^4 \times d1 \times 1000)/E1 \geq 2050$ and $(D2^4 \times d2 \times 1000)/E2 \geq 2050$. Even $(D1^4 \times d1 \times 1000)/E1 \geq 2500$ and $(D2^4 \times d2 \times 1000)/E2 \geq 2500$ and even better $(D1^4 \times d1 \times 1000)/E1 \geq 2700$ and $(D2^4 \times d2 \times 1000)/E2 \geq 2700$. In this first embodiment, also $3500 \geq (D1^4 \times d1 \times 1000)/E1$ and $3500 \geq (D2^4 \times d2 \times 1000)/E2$.

According to the invention, relationships I and II are satisfied:

$$-4053 \times E1 + 4720 \leq (D1^4 \times d1 \times 1000)/E1 \leq -4140 \times E1 + 5300 \qquad (I)$$

$$-4053 \times E2 + 4720 \leq (D2^4 \times d2 \times 1000)/E2 \leq -4140 \times E2 + 5300 \qquad (II)$$

The following relationships are also satisfied:

$$-4430 \times E1 + 5120 \leq (D1^4 \times d1 \times 1000)/E1 \leq -4140 \times E1 + 5300$$

$$-4430 \times E2 + 5120 \leq (D2^4 \times d2 \times 1000)/E2 \leq -4140 \times E2 + 5300$$

The characteristics D1, D2, d1, d2, E1, E2 and Ey are measured in the central part of the crown reinforcement 14 of the tyre 10 in the vulcanized state, on each side of the midplane M over a total axial width of 4 cm. All of the measurements are averaged over a total axial distance between −2.0 cm and +2.0 cm with respect to the centre of the working reinforcement.

Tyre According to a Second Embodiment of the Invention

A second embodiment of the invention will now be described with reference to the first embodiment. Thus, for the sake of conciseness, unless mentioned otherwise, only those features that differ from those of the tyre according to the first embodiment will be described.

Unlike in the first embodiment, each metallic monofilament 66, 68 respectively has a diameter ranging from 0.34 mm to 0.38 mm, preferably from 0.35 mm to 0.37 mm, and greater than or equal to 0.36 mm and here D1=D2=0.37 mm. The steel used is of the HT type and has a strength Rm equal to 2718 MPa for a diameter of 0.37 mm (namely 292 N).

Each density d1, d2 of the first and the second reinforcing elements 50, 52 ranges from 70 to 90 monofilaments per decimetre and preferably from 70 to 80 monofilaments per decimetre and is here such that d1=d2=74 monofilaments per decimetre. The mean thickness Ey radially separating a first reinforcing element 50 and a second reinforcing element 52 is Ey=0.13 mm. Ey, D1 and D2 are such that Ey/(Ey+D1)=Ey/(Ey+D2)=0.26.

Because d1≥0.36 mm and d2≥0.36 mm, the force at break of each first and second working ply 16, 18 ranges from 20000 N·dm$^{-1}$ to 24000 N·dm$^{-1}$ and is here equal to 21630 N·dm$^{-1}$.

With the values described above, $(D1^4 \times d1 \times 1000)/E1 = (D2^4 \times d2 \times 1000)/E2 = 2779$. Relationships I and II are satisfied in accordance with the invention:

$$-4053 \times E1 + 4720 \leq (D1^4 \times d1 \times 1000)/E1 \leq -4140 \times E1 + 5300 \qquad (I)$$

$$-4053 \times E2 + 4720 \leq (D2^4 \times d2 \times 1000)/E2 \leq -4140 \times E2 + 5300 \qquad (II)$$

Unlike in the first embodiment, the following relationships are also satisfied:

$$-4053 \times E1 + 4720 \leq (D1^4 \times d1 \times 1000)/E1 \leq -4430 \times E1 + 5120$$

$$-4053 \times E2 + 4720 \leq (D2^4 \times d2 \times 1000)/E2 \leq -4430 \times E2 + 5120$$

Tyre According to a Third Embodiment of the Invention

A third embodiment of the invention will now be described with reference to the first embodiment. Thus, for the sake of conciseness, unless mentioned otherwise, only those features that differ from those of the tyre according to the first embodiment will be described.

Unlike in the first embodiment, each metallic monofilament 66, 68 respectively has a diameter ranging from 0.34 mm to 0.38 mm, preferably from 0.35 mm to 0.37 mm, and greater than or equal to 0.36 mm and here D1=D2=0.37 mm. The steel used is of the HT type and has a strength Rm equal to 2718 MPa for a diameter of 0.37 mm (namely 292 N).

Each density d1, d2 of the first and the second reinforcing elements 50, 52 ranges from 70 to 90 monofilaments per decimetre and preferably from 70 to 80 monofilaments per decimetre and is here such that d1=d2=80 monofilaments per decimetre. The mean thickness Ey radially separating a first reinforcing element 50 and a second reinforcing element 52 is Ey=0.12 mm. Ey, D1 and D2 are such that Ey/(Ey+D1)=Ey/(Ey+D2)=0.24.

Because d1>0.36 mm and d2>0.36 mm, the force at break of each first and second working ply 16, 18 ranges from 20000 N·dm$^{-1}$ to 24000 N·dm$^{-1}$ and is here equal to 23360 N·dm$^{-1}$.

With the values described above, $(D1^4 \times d1 \times 1000)/E1 = (D2^4 \times d2 \times 1000)/E2 = 3085$. Relationships I and II are satisfied in accordance with the invention:

$$-4053 \times E1 + 4720 \leq (D1^4 \times d1 \times 1000)/E1 \leq -4140 \times E1 + 5300 \qquad (I)$$

$$-4053 \times E2 + 4720 \leq (D2^4 \times d2 \times 1000)/E2 \leq -4140 \times E2 + 5300 \qquad (II)$$

As in the first embodiment, the following relationships are also satisfied:

$$-4430 \times E1 + 5120 \leq (D1^4 \times d1 \times 1000)/E1 \leq -4140 \times E1 + 5300$$

$$-4430 \times E2 + 5120 \leq (D2^4 \times d2 \times 1000)/E2 \leq -4140 \times E2 + 5300$$

Tyre According to a Fourth Embodiment of the Invention

A fourth embodiment of the invention will now be described with reference to the first embodiment. Thus, for the sake of conciseness, unless mentioned otherwise, only those features that differ from those of the tyre according to the first embodiment will be described.

Unlike in the first embodiment, each metallic monofilament 66, 68 respectively has a diameter such that D1=D2=0.37 mm. The steel used is of the HT type and has a strength Rm equal to 2718 MPa for a diameter of 0.37 mm (namely 292 N).

Each density d1, d2 is, here, such that d1=d2=111 monofilaments per decimetre. The mean thickness Ey radially separating a first reinforcing element 50 and a second reinforcing element 52 is Ey=0.13 mm. Ey, D1 and D2 are such that Ey/(Ey+D1)=Ey/(Ey+D2)=0.26.

The force at break of each first and second working ply 16, 18 is here equal to 32444 N·dm$^{-1}$.

With the values described above, $(D1^4 \times d1 \times 1000)/E1 = (D2^4 \times d2 \times 1000)/E2 = 4169$. The following relationships are satisfied:

$$-4140 \times E1 + 5300 < (D1^4 \times d1 \times 1000)/E1$$

$$-4140 \times E2 + 5300 < (D2^4 \times d2 \times 1000)/E2$$

As in the first embodiment, the following relationships are also satisfied:

$$(D1^4 \times d1 \times 1000)/E1 \leq -7997 \times E1 + 9027$$

$$(D2^4 \times d2 \times 1000)/E2 \leq -7997 \times E2 + 9027$$

Tyre According to a Fifth Embodiment of the Invention

A fifth embodiment of the invention will now be described with reference to the first embodiment. Thus, for the sake of conciseness, unless mentioned otherwise, only those features that differ from those of the tyre according to the first embodiment will be described.

Unlike in the first embodiment, each metallic monofilament 66, 68 has a diameter such that D1=D2=0.37 mm. The steel used is of the HT type and has a strength Rm equal to 2718 MPa for a diameter of 0.37 mm (namely 292 N).

Each density d1, d2 of the first and the second reinforcing elements 50, 52 is here such that d1=d2=122 monofilaments per decimetre. The mean thickness Ey radially separating a first reinforcing element 50 and a second reinforcing element 52 is Ey=0.12 mm. Ey, D1 and D2 are such that Ey/(Ey+D1)=Ey/(Ey+D2)=0.25.

The force at break of each first and second working ply 16, 18 is here equal to 35610 N·dm$^{-1}$.

With the values described above, $(D1^4 \times d1 \times 1000)/E1 = (D2^4 \times d2 \times 1000)/E2 = 4654$. The following relationships are satisfied:

$$-4140 \times E1 + 5300 < (D1^4 \times d1 \times 1000)/E1$$

$$-4140 \times E2 + 5300 < (D2^4 \times d2 \times 1000)/E2$$

As in the first embodiment, the following relationships are also satisfied:

$$(D1^4 \times d1 \times 1000)/E1 \leq -7997 \times E1 + 9027$$

$$(D2^4 \times d2 \times 1000)/E2 \leq -7997 \times E2 + 9027$$

Comparative Tests

The following tests demonstrate that the working plies of tyres according to the invention make it possible to obtain, on the one hand, better resistance to buckling than the second prior art and, on the other hand, a better compromise between the resistance to buckling and the mass of the or each ply than the first and second prior arts, thanks to the specific combination of monofilaments having diameters chosen according to their density and according to the thickness of the corresponding working ply.

In these comparative tests, the resistance to buckling of the working reinforcements of the tyres T1, T2 introduced in the preamble of the present application and of tyres P1 to P12 and Q1 to Q12 according to the invention, and notably of tyres P10, P3 and P4 according to the first, second and third embodiments respectively and of tyres Q5 and Q6 respectively according to the fourth and fifth embodiments, was tested.

The conditions of use liable to generate buckling of the crown reinforcement of the tyre correspond to stress loadings on cornering with relatively high accelerations of at least 0.7 g. These accelerations may be greater in certain usage scenarios of the competitive type because in such cases aerodynamic effects may make it possible to generate vertical aerodynamic loadings that make it possible to generate lateral loadings in excess of 1 g. The tyre that is the most highly stressed is therefore the one that is on the outside of the corner and the lateral loading generated on the tyre is generally considered to be proportional to the vertical loading.

This vertical loading comprises the vertical load borne by the tyre when stationary or in a straight line, plus the load transfer. The vertical loading generated on the tyre is expressed using the following relationship:

$$Fz = Fz0\left(1 + \frac{\gamma_T}{g} \cdot \frac{H}{V}\right)$$

in which Fz0 is the vertical load and $FZ0 \cdot \gamma_T/g \cdot H/V$ is the load transfer.

The lateral loading generated on the tyre is proportional to the vertical loading and is therefore expressed by the following relationship:

$$Fy = Fz0 \cdot \frac{\gamma_T}{g}\left(1 + \frac{\gamma_T}{g} \cdot \frac{H}{V}\right)$$

In order to evaluate the buckling, runs are performed considering a reference load and applying loading pairs (Fy, Fz) on a machine or on a vehicle incrementally after various distances covered. An analysis of the tyres as a function of these stress loadings and of the distances covered makes it possible to determine whether buckling has been able to cause breakages in the working plies. The performance level is measured in terms of the distance covered without breakage.

The results of the buckling test are indicated in base 100 with respect to a tyre comprising working plies comprising reinforcing elements made up of assemblies of 2 filaments measuring 0.30 mm of the HT type at a density of 83 threads per decimetre. A value above 100 means that the ply has an improved resistance to buckling, namely has covered a longer distance, and a value below 100 means that the ply has a deteriorated resistance to buckling, namely has covered a shorter distance.

With regard to mass, the results are indicated in base 100 with respect to the working plies of the tyre T1. A value above 100 means that the ply has a mass higher than the mass of a ply of the tyre T1, and a value below 100 means that the ply has a mass lower than the mass of a ply of the tyre T1.

The results of this buckling test are collated in Tables 1 and 2 below (row RF) together with the diameter D of the metallic monofilaments of each working ply (which are identical), the thickness E of each working ply (which are identical), the thickness Ey, the indicator $(D^4 \times d)/E$ for each working ply (which are identical), where appropriate, the calculated values of $-4053 \times E+4720$, $-4430 \times E+5120$ and $-4140 \times E+5300$, as well as $-4140 \times E+5300$, $-6800 \times E+7850$, $-7997 \times E+9027$, and the force at break for each working ply (which are identical).

A comparison of tyres T1 and T2 confirms that tyre T2 has a lower mass than tyre T1 but at the expense of the resistance to buckling RF for which tyre T1 is far better.

All the tyres according to the invention exhibit a better compromise between resistance to buckling and mass than the tyres T1 and T2. Furthermore, the resistance to buckling of tyres P1 to P12 according to the invention is vastly superior to that of tyre T2. In the case of the tyres according to the invention for which $-4430 \times E1+5120 \leq (D1^4 \times d1 \times 1000)/E1 \leq -4140 \times E1+5300$ and/or $-4430 \times E2+5120 \leq (D2^4 \times d2 \times 1000)/E2 \leq -4140 \times E2+5300$, the resistance to buckling is equal or even superior to that of tyre T1. The other tyres according to the invention nevertheless exhibit largely satisfactory resistance to buckling.

In the case of the tyres according to the invention for which $-4140 \times E1+5300 < (D1^4 \times d1 \times 1000)/E1$ and/or $-4140 \times E2+5300 < (D2^4 \times d2 \times 1000)/E2$, the mass is close to that of tyre T1 and the gain in terms of resistance to buckling is significantly greater.

The invention is not limited to the embodiments described above. Specifically, it is possible to envisage embodiments in which just one of the two working plies satisfies the conditions described.

TABLE 1

|  | T1 | T2 | P1 | P2 | P3 | P4 | P5 |
|---|---|---|---|---|---|---|---|
| D (mm) | 0.32 | 0.30 | 0.37 | 0.37 | 0.37 | 0.37 | 0.37 |
| E (mm) | 0.75 | 0.48 | 0.45 | 0.43 | 0.50 | 0.49 | 0.60 |
| Ey (mm) | 0.43 | 0.18 | 0.09 | 0.07 | 0.14 | 0.12 | 0.23 |
| d (unit/dm) | 143 | 111 | 74 | 80 | 74 | 80 | 74 |
| $-4053 \times E + 4720$ | 1660 | 2780 | 2898 | 2953 | 2695 | 2750 | 2290 |
| $(D^4 \times d \times 1000)/E$ | 1984 | 1881 | 3087 | 3439 | 2779 | 3085 | 2315 |
| $-4430 \times E + 5120$ | 1776 | 3000 | 3143 | 3188 | 2922 | 2967 | 2479 |
| $-4140 \times E + 5300$ | 2175 | 3319 | 3453 | 3495 | 3246 | 3288 | 2832 |
| RF | 107 | 63 | 97 | 105 | 97 | 105 | 98 |
| Mass of the ply | 100 | 68 | 69 | 75 | 69 | 75 | 69 |
| Fr of the ply (N · dm$^{-1}$) | 33143 | 23000 | 21630 | 23360 | 21630 | 23360 | 21630 |

|  | P6 | P7 | P8 | P9 | P10 | P11 | P12 |
|---|---|---|---|---|---|---|---|
| D (mm) | 0.37 | 0.37 | 0.37 | 0.35 | 0.35 | 0.35 | 0.35 |
| E (mm) | 0.59 | 0.70 | 0.69 | 0.45 | 0.50 | 0.60 | 0.70 |
| Ey (mm) | 0.22 | 0.33 | 0.32 | 0.09 | 0.14 | 0.25 | 0.35 |
| d (unit/dm) | 80 | 74 | 80 | 100 | 100 | 100 | 100 |
| $-4053 \times E + 4720$ | 2345 | 1884 | 1940 | 2898 | 2695 | 2290 | 1884 |
| $(D^4 \times d \times 1000)/E$ | 2559 | 1984 | 2186 | 3363 | 3024 | 2517 | 2155 |
| $-4430 \times E + 5120$ | 2524 | 2036 | 2081 | 3143 | 2922 | 2479 | 2036 |
| $-4140 \times E + 5300$ | 2874 | 2418 | 2460 | 3453 | 3246 | 2832 | 2418 |
| RF | 105 | 98 | 105 | 105 | 105 | 105 | 105 |
| Mass of the ply | 75 | 69 | 75 | 84 | 84 | 84 | 84 |
| Fr of the ply (N · dm$^{-1}$) | 23360 | 21630 | 23360 | 27300 | 27300 | 27300 | 27300 |

TABLE 2

|  | T1 | T2 | Q1 | Q2 | Q3 | Q4 | Q5 | Q6 |
|---|---|---|---|---|---|---|---|---|
| D (mm) | 0.32 | 0.30 |  |  | 0.37 |  |  |  |
| E (mm) | 0.75 | 0.48 |  | 0.45 |  |  | 0.50 |  |
| Ey (mm) | 0.43 | 0.18 |  | 0.08 |  |  | 0.12 |  |
| d (unit/dm) | 143 | 111 | 100 | 111 | 122 | 100 | 111 | 122 |
| $-4140 \times E + 5300$ | 2175 | 3319 |  | 3447 |  |  | 3267 |  |
| $(D^4 \times d \times 1000)/E$ | 1984 | 1881 | 4188 | 4633 | 5181 | 3767 | 4169 | 4654 |
| $-6800 \times E + 7850$ | 2717 | 4596 |  | 4807 |  |  | 4467 |  |
| $-7997 \times E + 9027$ | 2990 | 5200 |  | 5448 |  |  | 5048 |  |
| RF | 107 | 63 | 131 | 145 | 159 | 131 | 145 | 159 |
| Mass of the ply | 100 | 68 | 94 | 104 | 114 | 94 | 104 | 114 |
| Fr of the ply (N · dm$^1$) | 33143 | 23000 | 29200 | 32444 | 35610 | 29200 | 32444 | 35610 |

|  | Q7 | Q8 | Q9 | Q10 | Q11 | Q12 |
|---|---|---|---|---|---|---|
| D (mm) |  |  | 0.37 |  |  |  |
| E (mm) |  | 0.60 |  |  | 0.70 |  |
| Ey (mm) |  | 0.23 |  |  | 0.33 |  |
| d (unit/dm) | 100 | 111 | 122 | 100 | 111 | 122 |
| $-4140 \times E + 5300$ |  | 2826 |  |  | 2412 |  |
| $(D^4 \times d \times 1000)/E$ | 3137 | 3474 | 3866 | 2687 | 2977 | 3307 |
| $-6800 \times E + 7850$ |  | 3774 |  |  | 3107 |  |
| $-7997 \times E + 9027$ |  | 4249 |  |  | 3449 |  |
| RF | 131 | 146 | 160 | 132 | 147 | 161 |
| Mass of the ply | 94 | 104 | 114 | 94 | 104 | 114 |
| Fr of the ply (N · dm$^1$) | 29200 | 32444 | 35610 | 29200 | 32444 | 35610 |

The invention claimed is:

1. A tire, defining three main directions circumferential, axial and radial, comprising a crown comprising a tread, two sidewalls, and two beads, each sidewall connecting each bead to the crown, a carcass reinforcement anchored in each of the beads and extending in the sidewalls and in the crown, a crown reinforcement extending in the crown in the circumferential direction and situated radially between the carcass reinforcement and the tread, the crown reinforcement comprising a working reinforcement comprising at least first and second working plies, each first and second working ply respectively comprising first and second reinforcing elements arranged substantially parallel to one another in each first and second working ply, wherein both of the following relationships I and II are satisfied:

$$-4053 \times E1 + 4720 \leq (D1^4 \times d1 \times 1000)/E1 \quad (I)$$

where D1 is a diameter of each first reinforcing element made up of a metallic monofilament, expressed in mm, with D1 ranging from 0.34 to 0.38 mm,
d1 is a density of the first reinforcing elements in the first working ply, expressed in monofilaments per decimeter and measured in a direction perpendicular to the main axis of the metallic monofilaments, and
E1 is a mean thickness of the first working ply, expressed in mm and measured in the radial direction; and $$-4053 \times E2 + 4720 \leq (D2^4 \times d2 \times 1000)/E2 \quad (II)$$

where D2 is a diameter of each second reinforcing element made up of a metallic monofilament, expressed in mm, with D2 ranging from 0.34 to 0.38 mm,
d2 is a density of the second reinforcing elements in the second working ply, expressed in monofilaments per decimeter and measured in a direction perpendicular to the main axis of the metallic monofilaments, and
E2 is a mean thickness of the second working ply, expressed in mm and measured in the radial direction, wherein each of D1 and D2 are identical,
wherein each of E1 and E2 are identical, and less than 0.75 mm,
wherein each of d1 and d2 are identical, and range from 70 to 180 monofilaments per decimeter, and
wherein the characteristics D1, D2, d1, d2, E1, E2 being measured in a central part of the crown reinforcement of the tire in the vulcanized state, on each side of a midplane over a total axial width of 4 cm.

2. The tire according to claim 1, wherein both of the following relationships are satisfied:

$$(D1^4 \times d1 \times 1000)/E1 \leq -7997 \times E1 + 9027$$

and $$(D2^4 \times d2 \times 1000)/E2 < -7997 \times E2 + 9027.$$

3. The tire according to claim 1, wherein both of the following relationships are satisfied:

$$(D1^4 \times d1 \times 1000)/E1 \leq -6800 \times E1 + 7850$$

and $$(D2^4 \times d2 \times 1000)/E2 < -6800 \times E2 + 7850.$$

4. The tire according to claim 1, wherein both of the following relationships are satisfied:

$$(D1^4 \times d1 \times 1000)/E1 < 5300 \text{ and } (D2^4 \times d2 \times 1000)/E2 < 5300.$$

5. The tire according to claim 1, wherein both of the following relationships are satisfied:

$$-4053 \times E1 + 4720 < (D1^4 \times d1 \times 1000)/E1 < -4140 \times E1 + 5300$$

and $$-4053 \times E2 + 4720 < (D2^4 \times d2 \times 1000)/E2 < -4140 \times E1 + 5300.$$

6. The tire according to claim 1, wherein both of the following relationships are satisfied:

$$-4053 \times E1 + 4720 < (D1^4 \times d1 \times 1000)/E1 < -4430 \times E1 + 5120$$

and $$-4053 \times E2 + 4720 < (D2^4 \times d2 \times 1000)/E2 < -4430 \times E2 + 5120.$$

7. The tire according to claim 1, wherein both of the following relationships are satisfied:

$$-4430 \times E1 + 5120 \leq (D1^4 \times d1 \times 1000)/E1 < -4140 \times E1 + 5300$$

and $$-4430 \times E2 + 5120 < (D2^4 \times d2 \times 1000)/E2 < -4140 \times E2 + 5300.$$

8. The tire according to claim 1, wherein both of the following relationships are satisfied:

$$2050 < (D1^4 \times d1 \times 1000)/E1 \text{ and } 2050 < (D2^4 \times d2 \times 1000)/E2.$$

9. The tire according to claim 1, wherein both of the following relationships are satisfied:

$$2500 < (D1^4 \times d1 \times 1000)/E1 \text{ and } 2500 < (D2^4 \times d2 \times 1000)/E2.$$

10. The tire according to claim 1, wherein both of the following relationships are satisfied:

$$2700 < (D1^4 \times d1 \times 1000)/E1 \text{ and } 2700 < (D2^4 \times d2 \times 1000)/E2.$$

11. The tire according to claim 1, wherein $$(D1^4 \times d1 \times 1000)/E1 < 3500 \text{ and/or } (D2^4 \times d2 \times 1000)/E2 < 3500.$$

12. The tire according to claim 1, wherein each of E1 and E2 is greater than or equal to 0.40 mm.

13. The tire according to claim 1, wherein a mean thickness Ey radially separating a first reinforcing element and a second reinforcing element, measured in the radial direction, ranges from 0.05 to 0.40 mm.

14. The tire according to claim 13, wherein Ey and D1 satisfy the following relationship:

$$0.15 \leq Ey/(Ey+D1) \leq 0.50.$$

15. The tire according to claim 13, wherein Ey and D2 satisfy the following relationship:

$$0.15 \leq Ey/(Ey+D2) \leq 0.50.$$

16. The tire according to claim 1, wherein the first reinforcing elements make an angle ranging from 10 to 45 degrees with the circumferential direction.

17. The tire according to claim 1, wherein the second reinforcing elements make an angle ranging from 10 to 45 degrees with the circumferential direction.

18. The tire according to claim 1, wherein the first and second reinforcing elements are crossed relative to one another between the first working ply and the second working ply.

19. The tire according to claim 1, wherein a force at break of the first working ply and/or a force at break of the second working ply ranges from 18000 N·dm$^{-1}$ to 32000 N·dm$^{-1}$.

20. The tire according to claim 1 further comprising a hoop reinforcement comprising at least one hooping ply comprising textile reinforcing elements arranged substantially parallel to one another in the hooping ply.

21. The tire according to claim 20, wherein the textile reinforcing elements form an angle at most equal to 10° with the circumferential direction.

22. The tire according to claim 1, wherein the tread has a thickness ranging from 3 mm to 6 mm.

23. The tire according to claim 1, wherein the tread has a thickness ranging from 5.5 mm to 7 mm.

24. The tire according to claim 1, wherein the tread has a thickness ranging from 7 mm to 10.5 mm.

\* \* \* \* \*